United States Patent
Sahouani

(10) Patent No.: US 7,687,115 B2
(45) Date of Patent: Mar. 30, 2010

(54) METHOD FOR MAKING NANOSTRUCTURED SURFACES

(75) Inventor: Hassan Sahouani, Hastings, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 440 days.

(21) Appl. No.: 11/284,541

(22) Filed: Nov. 22, 2005

(65) Prior Publication Data

US 2006/0111482 A1   May 25, 2006

Related U.S. Application Data

(63) Continuation-in-part of application No. 10/997,445, filed on Nov. 24, 2004.

(51) Int. Cl.
*B05D 1/36* (2006.01)
(52) U.S. Cl. .............. 427/407.1; 428/1.2; 428/1.1; 428/1.31; 427/256; 427/430.1
(58) Field of Classification Search ............ 428/1.1, 428/1.2, 1.31; 252/299.01, 299.5, 299.62, 252/299.61, 299.4; 427/407.1
See application file for complete search history.

(56) References Cited

U.S. PATENT DOCUMENTS

| | | | |
|---|---|---|---|
| 4,882,166 A | 11/1989 | Graham et al. | |
| 5,948,487 A | 9/1999 | Sahouani et al. | |
| 6,051,290 A | 4/2000 | Sahouani et al. | |
| 6,214,499 B1 | 4/2001 | Helber et al. | |
| 6,245,399 B1 * | 6/2001 | Sahouani et al. | 428/1.31 |
| 6,248,364 B1 | 6/2001 | Sengupta et al. | |
| 6,355,386 B1 | 3/2002 | Helber et al. | |
| 6,395,354 B1 | 5/2002 | Sahouani et al. | |
| 6,411,354 B1 | 6/2002 | Lavrentovich et al. | |
| 6,488,866 B1 | 12/2002 | Sahouani et al. | |
| 6,527,977 B2 | 3/2003 | Helber et al. | |
| 6,538,714 B1 | 3/2003 | Sahouani et al. | |
| 6,562,363 B1 | 5/2003 | Mantelle et al. | |
| 6,570,632 B2 | 5/2003 | Lavrentovich et al. | |
| 6,574,044 B1 | 6/2003 | Sahouani et al. | |
| 6,576,712 B2 | 6/2003 | Feldstein et al. | |
| 6,645,578 B2 * | 11/2003 | Sahouani et al. | 428/1.2 |
| 6,673,398 B2 | 1/2004 | Schneider et al. | |
| 6,696,077 B2 | 2/2004 | Scherr | |
| 6,699,533 B2 | 3/2004 | Sahouani et al. | |
| 6,777,036 B2 | 8/2004 | Bravo Vasquez et al. | |
| 6,962,734 B2 | 11/2005 | Nazarov et al. | |
| 2002/0066885 A1 | 6/2002 | Sahouani et al. | |
| 2002/0132065 A1 | 9/2002 | Sahouani et al. | |
| 2002/0168511 A1 | 11/2002 | Schneider et al. | |

(Continued)

FOREIGN PATENT DOCUMENTS

EP    1 232 414 B1    8/2002

(Continued)

OTHER PUBLICATIONS

Huang et al., "Nanowire Arrays Electrodeposited from Liquid Crystalline Phases", Advanced Materials, (Jan. 4, 2002), pp. 61-64, vol. 14, No. 1, Wiley-VCH Verlag GmbH, D-69469 Weinheim.

(Continued)

*Primary Examiner*—Michael Barr
*Assistant Examiner*—Andrew Bowman
(74) *Attorney, Agent, or Firm*—Gregory D. Allen

(57) ABSTRACT

A method of making nanostructured surfaces by (a) making an aqueous mixture comprising (i) a discontinuous phase comprising a water-soluble polymer, (ii) a continuous phase comprising a chromonic material, and (iii) a non-ionic surfactant; (b) applying said mixture onto the surface of a substrate; and (c) allowing said mixture to dry.

22 Claims, 1 Drawing Sheet

U.S. PATENT DOCUMENTS

| | | | |
|---|---|---|---|
| 2003/0008145 | A1 | 1/2003 | Goldstein |
| 2004/0058091 | A1* | 3/2004 | Dutova et al. ............... 428/1.1 |
| 2006/0110528 | A1 | 5/2006 | Sahouani |
| 2006/0110540 | A1 | 5/2006 | Sahouani |
| 2006/0110922 | A1 | 5/2006 | Sahouani |
| 2007/0086964 | A1 | 4/2007 | Moran et al. |
| 2007/0086965 | A1 | 4/2007 | Mohanty et al. |
| 2007/0128291 | A1 | 6/2007 | Tokie et al. |
| 2007/0140957 | A1 | 6/2007 | Mohanty et al. |
| 2007/0141351 | A1 | 6/2007 | Mohanty et al. |
| 2007/0148458 | A1 | 6/2007 | Sahouani et al. |

FOREIGN PATENT DOCUMENTS

| | | |
|---|---|---|
| KR | 10-2003-0010846 | 2/2003 |
| WO | WO 98/37997 A2 | 9/1998 |
| WO | WO 00/22463 A1 | 4/2000 |
| WO | WO2004/033488 | 4/2004 |
| WO | WO2005/011629 | 2/2005 |
| WO | WO 2005/012488 A2 | 2/2005 |

OTHER PUBLICATIONS

Fang et al., "Aggregation and Surface-Enhanced Raman Activity Study of Dye-Coated Mixed Silver-Gold Colloids", *Journal of Raman Spectroscopy*, (2004), pp. 914-920, vol. 35, No. 11, John Wiley & Sons, Ltd.

Hurley, L. H. et al., "G-quadruplexes as Targets for Drug Design", *Pharmacol Ther.*, (Mar. 2000), vol. 83, No. 3, pp. 141-158.

Kostko, A. F. et al., "Salt Effects on the Phase Behavior, Structure, and Rheology of Chromonic Liquid Crystals", *J. Phys. Chem.*, (Oct. 20, 2005), vol. 109, No. 41, pp. 19126-19133.

Stenzel et al., "The Incorporation of Metal Clusters Into Thin Organic Dye Layers as a Method for Producing Strongly Absorbing Composite Layers: An Oscillator Model Approach to Resonant Metal Cluster Absorption", *Journal of Physics D: Applied Physics*, (1995), pp. 2154-2162, vol. 28, No. 10, IOP Publishing, Ltd.

Barbic et al., "Single Crystal Silver Nanowires Prepared by the Metal Amplification Method", Journal of Applied Physics, (Jun. 1, 2002), pp. 9341-9345, vol. 91, No. 11, 2002 American Institute of Physics.

Kawasaki et al., "Controlled Layering of Two-Dimensional J-Aggregate of Anionic Cyanine Dye on Self-Assembled Cysteamine Monolayer on Au(111)", Langmuir, (2000), pp. 5409-5417, vol. 16, No. 12, 2000 American Chemical Society.

Pardavi-Horvath et al., "Iron-Alumina Nanocomposites Prepared by Ball Milling", IEEE Transactions on Magnetics, (Sep. 1992), pp. 3186-3188, vol. 28, No. 5.

Lydon, "Chromonic Mesophases", Current Opinion in Colloid and Interface Science, (2004), pp. 480-490, vol. 8.

Ding et al., "Structure Analysis of Nanowires and Nanobelts by Transmission Electron Microscopy", J. Phys. Chem. B, (2004), pp. 12280-12291, vol. 108, No. 33.

Attwood et al., "Lyotropic Mesophase Formation by Anti-Asthmatic Drugs", Mol. Cryst. Liq. Cryst., (1984), pp. 349-357, vol. 108, Gordon and Breach, Science Publishers, Inc.

Brinker et al., "Review of Sol-Gel Thin Film Formation", Journal of Non-Crystalline Solids, (1992), pp. 424-436, vol. 147&148, Elsevier Science Publishers B. V.

Lydon, "Chapter XVIII, Chromonics", Handbook of Liquid Crystals, (1998), pp. 981-1007, vol. 2 B: Low Molecular Weight Liquid Crystals II, Wiley-VCH Verlag GmbH. D-60469 Weinheim.

Aguirre et al., "CTAB Mediated Reshaping of Metallodielectric Nanoparticles", Nano Letters, (2003), pp. 1707-1711, vol. 3, No. 12, American Chemical Society.

Medintz et al., "Self-Assembled Nanoscale Biosensors Based on Quantum Dot FRET Donors", Nature Materials, (Sep. 2003), pp. 630-638, vol. 2, Nature Publishing Group.

Kumar et al., "Linear Superclusters of Colloidal Gold Particles by Electrostatic Assembly on DNA Templates", Advanced Materials, (Mar. 2, 2001), pp. 341-344, Vol. 13, No. 5, Wiley-VCH Verlag GmbH, D-69469 Weinheim.

Hong et al., "Ultrathin Single-Crystalline Silver Nanowire Arrays Formed in an Ambient Solution Phase", Science, (Oct. 12, 2001), pp. 348-351, vol. 294.

Zhang et al., "Polymer Microgels: Reactors for Semiconductor, Metal, and Magnetic Nanoparticles", JACS, (2004), 7908-7914, vol. 126, No. 25, American Chemical Society.

* cited by examiner

METHOD FOR MAKING NANOSTRUCTURED SURFACES

CROSS-REFERENCE TO RELATED APPLICATIONS

This application is a continuation-in-part of U.S. application Ser. No. 10/997,445, filed Nov. 24, 2004, now pending.

FIELD

This invention relates to methods for making nanostructured surfaces using chromonic compounds.

BACKGROUND

The properties (for example, chemical, physical, electrical, optical, and magnetic properties) of materials depend, in part, on their atomic structure, microstructure, and grain boundaries or interfaces. Materials structured in the nanoscale range (that is, in the 0.1 to 100 nm range) have therefore been attracting interest because of their unique properties as compared to conventional materials. As a result, there has been increasing research effort to develop nanostructured materials for a variety of technological applications such as, for example, electronic and optical devices, labeling of biological material, magnetic recording media, and quantum computing.

Numerous approaches have been developed for synthesizing/fabricating nanostructured materials. Approaches include, for example, using milling or shock deformation to mechanically deform solid precursors such as, for example, metal oxides or carbonates to produce a nanostructured powder (see, for example, Pardavi-Horvath et al., IEEE Trans. Magn., 28, 3186 (1992)), and using sol-gel processes to prepare nanostructured metal oxide or ceramic oxide powders and films (see, for example, (U.S. Pat. No. 5,876,682 (Kurihara et al.), and Brinker et al., J. Non-Cryst. Solids, 147-148; 424-436 (1992)).

SUMMARY

It has been recognized that there is a need for a method for making nanostructured surfaces that provides control over the size and shape of the nanostructures, as well as their orientation and distribution, over a relatively large area.

Briefly, the present invention provides a method of making nanostructured surfaces. The method comprises (a) making an aqueous mixture comprising (i) a discontinuous phase comprising a water-soluble polymer, (ii) a continuous phase comprising a chromonic material, and (iii) a non-ionic surfactant; (b) applying the mixture onto the surface of a substrate; and (c) allowing the mixture to dry.

As used herein, "chromonic materials" (or "chromonic compounds") refers to large, multi-ring molecules typically characterized by the presence of a hydrophobic core surrounded by various hydrophilic groups (see, for example, Attwood, T. K., and Lydon, J. E., Molec. Crystals Liq. Crystals, 108, 349 (1984)). The hydrophobic core can contain aromatic and/or non-aromatic rings. When in solution, these chromonic materials tend to aggregate into a nematic ordering characterized by a long-range order.

The method of the invention enables the fabrication of surfaces having relatively uniformly sized and shaped nanostructures. The method further enables relatively uniform distribution and long-range orientation or order of the nanostructures over a relatively large area.

Thus, the method of the invention meets the need in the art for an improved method for making nanostructured surfaces.

In another aspect, the present invention provides an aqueous composition comprising a water-soluble polymer and a chromonic compound.

DESCRIPTION OF DRAWINGS

The FIGURE is an optical micrograph showing a nanostructured surface comprising polyvinyl alcohol in a chromonic matrix.

DETAILED DESCRIPTION

Any chromonic material can be useful in the method of the invention. Compounds that form chromonic phases are known in the art, and include, for example, xanthoses (for example, azo dyes and cyanine dyes) and perylenes (see, for example, Kawasaki et al., Langmuir 16, 5409 (2000), or Lydon, J., Colloid and Interface Science, 8, 480 (2004)). Representative examples of useful chromonic materials include di- and mono-palladium organyls, sulfamoyl-substituted copper phthalocyanines, and hexaaryltryphenylene.

Preferred chromonic materials include those represented by one of the following general structures:

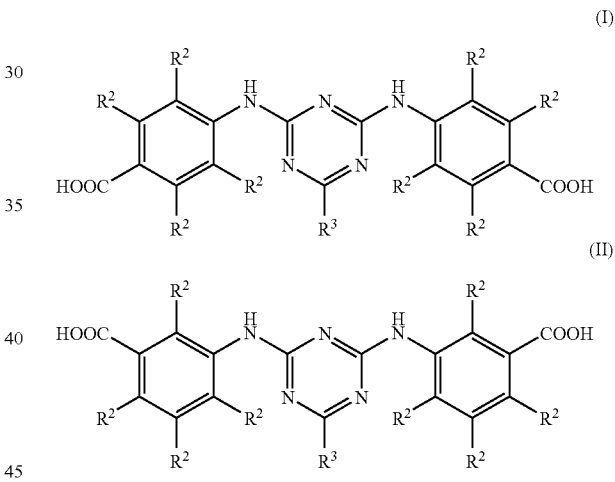

wherein
each $R^2$ is independently selected from the group consisting of electron donating groups, electron withdrawing groups, and electron neutral groups, and
$R^3$ is selected from the group consisting of substituted and unsubstituted heteroaromatic rings and substituted and unsubstituted heterocyclic rings, the rings being linked to the triazine group through a nitrogen atom within the ring of $R^3$.

As depicted above, the chromonic compound is neutral, but it can exist in alternative forms such as a zwitterion or proton tautomer (for example, where a hydrogen atom is dissociated from one of the carboxyl groups and is associated with one of the nitrogen atoms in the triazine ring). The chromonic compound can also be a salt such as, for example, a carboxylate salt.

The general structures above show orientations in which the carboxy group is para with respect to the amino linkage to the triazine backbone of the compound (formula I) and in which the carboxy group is meta with respect to the amino linkage to the triazine backbone (formula II). The carboxy group can also be a combination of para and meta orientations (not shown). Preferably, the orientation is para.

Preferably, each $R^2$ is hydrogen or a substituted or unsubstituted alkyl group. More preferably, $R^2$ is independently selected from the group consisting of hydrogen, unsubstituted alkyl groups, alkyl groups substituted with a hydroxy or halide functional group, and alkyl groups comprising an ether, ester, or sulfonyl. Most preferably, $R^2$ is hydrogen.

$R^3$ can be, but is not limited to, heteroaromatic rings derived from pyridine, pyridazine, pyrimidine, pyrazine, imidazole, oxazole, isoxazole thiazole, oxadiazole, thiadiazole, pyrazole, triazole, triazine, quinoline, and isoquinoline. Preferably, $R^3$ comprises a heteroaromatic ring derived from pyridine or imidazole. A substituent for the heteroaromatic ring $R^3$ can be selected from, but is not limited to, the group consisting of substituted and unsubstituted alkyl, carboxy, amino, alkoxy, thio, cyano, amide, sulfonyl, hydroxy, halide, perfluoroalkyl, aryl, ether, and ester. Preferably, the substituent for $R^3$ is selected from the group consisting of alkyl, sulfonyl, carboxy, halide, perfluoroalkyl, aryl, ether, and alkyl substituted with hydroxy, sulfonyl, carboxy, halide, perfluoroalkyl, aryl, or ether. When $R^3$ is a substituted pyridine, the substituent is preferably located at the 4-position. When $R^3$ is a substituted imidazole, the substituent is preferably located at the 3-position.

Representative examples of $R^3$ include 4-(dimethylamino)pyridinium-1-yl, 3-methylimidazolium-1-yl, 4-(pyrrolidin-1-yl)pyridinium-1-yl, 4-isopropylpyridinium-1-yl, 4-[(2-hydroxyethyl)methylamino]pyridinium-1-yl, 4-(3-hydroxypropyl)pyridinium-1-yl, 4-methylpyridinium-1-yl, quinolinium-1-yl, 4-tert-butylpyridinium-1-yl, and 4-(2-sulfoethyl)pyridinium-1-yl, shown below.

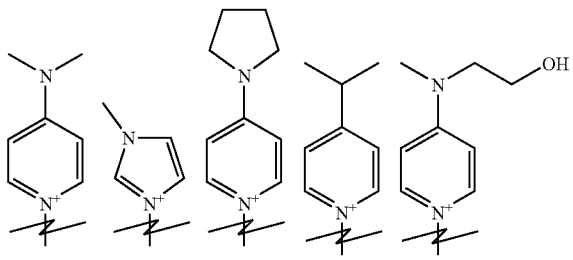

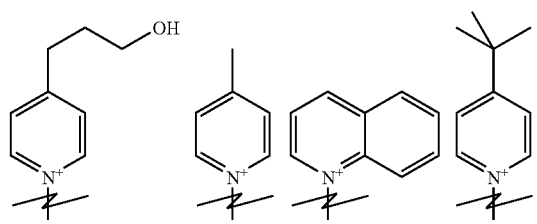

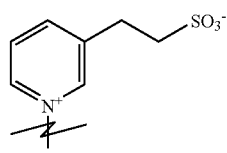

$R^3$ can also be represented by the following general structure:

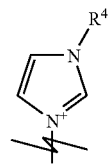

wherein $R^4$ is hydrogen or a substituted or unsubstituted alkyl group. More preferably, $R^4$ is selected from the group consisting of hydrogen, unsubstituted alkyl groups, and alkyl groups substituted with a hydroxy, ether, ester, sulfonate, or halide functional group. Most preferably $R^4$ is selected from the group consisting of propyl sulfonic acid, methyl, and oleyl.

$R^3$ can also be selected from heterocyclic rings such as, for example, morpholine, pyrrolidine, piperidine, and piperazine.

A preferred chromonic compound for use in the method of the invention can be represented by one of the following structures:

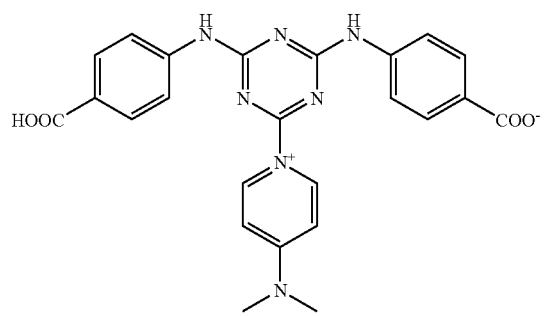

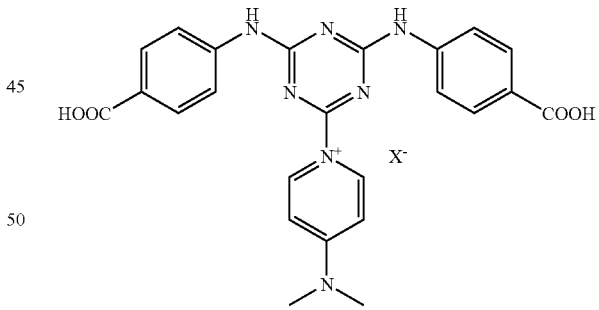

wherein $X^-$ is a counterion. Preferably, $X^-$ is selected from the group consisting of $HSO_4^-$, $Cl^-$, $CH_3COO^-$, and $CF_3COO^-$.

Formula III depicts the compound in its zwitterionic form. The pyridine nitrogen therefore carries a positive charge and one of the carboxy functional groups carries a negative charge ($COO^-$).

The compound can also exist in other tautomeric forms such as where both carboxy functional groups carry a negative charge and where positive charges are carried by one of the nitrogens in the triazine groups and the nitrogen on the pyridine group.

As described in U.S. Pat. No. 5,948,487 (Sahouani et al.), which is herein incorporated by reference in its entirety, triazine derivatives with formula I can be prepared as aqueous solutions. A typical synthetic route for the triazine molecules shown in formula I above involves a two-step process. Cyanuric chloride is treated with 4-aminobenzoic acid to give 4-{[4-(4-carboxyanilino)-6-chloro-1,3,5-triazin-2-yl]amino}benzoic acid. This intermediate is treated with a substituted or unsubstituted nitrogen-containing heterocycle. The nitrogen atom of the heterocycle displaces the chlorine atom on the triazine to form the corresponding chloride salt. The zwitterionic derivative, such as that shown in formula III above, is prepared by dissolving the chloride salt in ammonium hydroxide and passing it down an anion exchange column to replace the chloride with hydroxide, followed by solvent removal. Alternative structures, such as that shown in formula II above, may be obtained by using 3-aminobenzoic acid instead of 4-aminobenzoic acid.

Chromonic materials are capable of forming a chromonic phase or assembly when dissolved in an aqueous solution (preferably, an alkaline aqueous solution). Chromonic phases or assemblies are well known in the art (see, for example, Handbook of Liquid Crystals, Volume 2B, Chapter XVIII, Chromonics, John Lydon, pp. 981-1007, 1998) and consist of stacks of flat, multi-ring aromatic molecules. The molecules consist of a hydrophobic core surrounded by hydrophilic groups. The stacking can take on a number of morphologies, but is typically characterized by a tendency to form columns created by a stack of layers. Ordered stacks of molecules are formed that grow with increasing concentration.

Preferably, the chromonic material is placed in aqueous solution in the presence of one or more pH-adjusting compounds and a surfactant. The addition of pH-adjusting compounds allows the chromonic material to become more soluble in aqueous solution. Suitable pH-adjusting compounds include any known base such as, for example, ammonium hydroxide or various amines. Surfactant can be added to the aqueous solution to promote wetting of the solution onto the surface of a substrate. Suitable surfactants include ionic and non-ionic surfactants (preferably, non-ionic). Optional additives such as viscosity modifiers (for example, polyethylene glycol) and/or binders (for example, low molecular weight hydrolyzed starches) can also be added.

Typically, the chromonic materials are dissolved in the aqueous solution at a temperature less than about 40° C. (more typically, at room temperature). One skilled in the art will recognize, however, that the geometry and size of the resulting nanostructures can be controlled to some extent by varying the temperature.

The relative concentrations of each of the components in the aqueous solution will vary with the desired size of the resulting nanostructures and their intended application. Generally, however, the chromonic material will be added to the solution to achieve a concentration in the range of about 4 to about 20 (preferably, about 4 to about 8) percent by weight of the solution.

The aqueous composition comprising a chromonic material can be mixed with a discontinuous phase comprising a water-soluble polymer. Typically, the weight ratio of water-soluble polymer to chromonic material is between about 0.01 and about 0.5:1 (preferably, less than 0.2:1). Preferably, the water-soluble polymer has a molecular weight of less than about 20,000.

Useful water-soluble polymers include, for example, polyvinyl-based water-soluble polymers, polycarboxylates, polyacrylates, polyamides, polyamines, polyglycols, and the like, and mixtures thereof. Copolymers, for example, block or random copolymers can also be useful. Preferred water-soluble polymers include, for example, polyvinyl alcohol, polyethylene glycol, polypropylene glycol, poly(ethylene glycol)-co-(propylene glycol), and mixtures thereof.

The aqueous mixture also includes a non-ionic surfactant. Preferably, the non-ionic surfactant is an alkyl glucoside surfactant.

The weight ratio of non-ionic surfactant to chromonic material is generally between about 0.01:1 and about 0.3:1. For some applications, it is preferable that the weight ratio of non-ionic surfactant to chromonic material be less than about 0.03:1, or even less than about 0.01:1

Optionally, other additives (for example, short chain alcohols such as ethanol) that increase surface tension or promote coating can be added.

The resulting mixture can be applied to the surface of a substrate. Suitable substrates include any solid materials that will accept the application of the mixture (for example, glass or polymeric films).

The mixture can be applied by any useful means that provides for the ordered arrangement of the chromonic materials such as, for example, by coating techniques such as wire-wound coating rod or extrusion die methods. Preferably, shear orientation or magnetic orientation is applied to the mixture either during or after application. The application of shear or magnetic force to the mixture can help promote alignment of the chromonic materials such that, upon drying, an oriented structure or matrix is obtained.

Drying of the coated layer can be achieved using any means suitable for drying aqueous coatings. Useful drying methods will not damage the coating or significantly disrupt the orientation of the coated layer imparted during coating or application.

After drying, the water-soluble polymer can be removed such that only the chromonic matrix remains on the substrate. The chromonic matrix will have holes or gaps where the water-soluble polymer used to be. The chromonic matrix can then be used as a mold to make surfaces such as, for example, surfaces comprising polymer posts in the nanometer to micrometer range. The size of the posts is dependent upon the relative concentration of the components. For example, the higher the concentration of water-soluble polymer, the larger the holes in the chromonic matrix will generally be, and thus the larger the resulting posts.

Advantageously, unlike in other systems that phase separate (for example, polymer-polymer systems), the water-soluble polymer can be easily removed from the chromonic material. For example, the water-soluble polymer can be removed by heating to a temperature higher than the temperature at which the water-soluble polymer decomposes, but lower than which the chromonic material decomposes (for example, by heating to between about 200° C. and 350° C.). Alternatively, the chromonic material can be rendered insoluble (for example, by protonization or amidization (that is, by reaction with diamine), or by exposure to a solution of multivalent cations thus ionically crosslinking it), and the water-soluble polymer can be removed with water.

After the water-soluble polymer has been removed, a water-insoluble polymer or a molten metal with a melting point lower than the decomposition temperature of the chromonic material (for example, indium or tin) can be applied on the chromonic matrix. The water-insoluble polymer or molten metal will go into the holes or gaps in the matrix that were formerly filled with water-soluble polymer.

Suitable water-insoluble polymers include, for example, polystyrene, polycarbonate, polymethyl-methacrylate, polyethylene, and the like, and copolymers thereof, and mixtures thereof. Water-insoluble polymer precursors or monomers can also be poured on the chromonic matrix and subsequently polymerized/cross-linked to form a water-insoluble polymer on the chromonic matrix.

The water-insoluble polymer can be separated from the chromonic matrix, for example, by peeling it off. The water-insoluble polymer and chromonic matrix can be soaked in a basic aqueous solution before peeling to facilitate loosening the polymer from the matrix. The resulting nanostructured surface (for example, nanosized polymer posts) of the peeled water-insoluble polymer makes the polymer layer useful, for example, in antireflective/diffraction applications. Nanostructured metal surfaces can be used in field emission devices.

The method of the invention can also be used to make nanostructured metal surfaces such as, for example, nano-sized metal meshes or grids. In order to make nanostructured metal surfaces, a metal salt can be added to the continuous chromonic phase before it is mixed with the discontinuous phase. That is, a metal salt can be added to the aqueous composition comprising a chromonic material before it is mixed with the discontinuous phase comprising a water-soluble polymer.

Preferred metal salts include noble metal salts. More preferred metal salts include silver salts (for example, silver nitrate, silver acetate, and the like), gold salts (for example, gold sodium thiomalate, gold chloride, and the like), platinum salts (for example, platinum nitrate, platinum chloride, and the like), and mixtures thereof. Most preferred metal salts include, silver nitrate, silver acetate, gold sodium thiomalate, gold chloride, and mixtures thereof.

Generally, the metal salt will be present in the continuous chromonic phase at a concentration of less than about 50 percent by weight of the continuous chromonic phase.

The resulting mixture can be applied onto the surface of a substrate and allowed to dry as described above. After the mixture is dry, the metal salt can be reduced via reduction methods known in the art. For example, the reduction can be accomplished by using a reducing agent (for example, tris(dimethylamino)borane, sodium borohydride, potassium borohydride, or ammonium borohydride), electron beam (e-beam) processing, or ultraviolet (UV) light.

The water-soluble polymer can be removed as described above. The chromonic matrix can also be removed using any means such as, for example by heating to decomposition (for example, by heating to higher than about 300° C.). The resulting nanosized metal mesh or grid can be used, for example, in applications such as electro-magnetic interference (EMI) filters.

The method of the invention can also be used to make two-dimensional arrays of water-insoluble particles. Water-insoluble particles can be added to the discontinuous phase before it is mixed with the continuous chromonic phase. Typically, the concentration of water-insoluble particles in the resulting mixture (that is, the mixture of the continuous chromonic and discontinuous phases) will be in the range of about 1 to about 35 percent by weight of the total solids.

Preferred water-insoluble particles include, for example, substantially charge neutralized particles of metal, silica, diamond, and the like, and mixtures thereof.

Preferred metal particles include noble metal particles. More preferred metal particles include silver particles, gold particles, platinum particles, and mixtures and alloys thereof. Non-noble metal particles having a non-ionic surface such as, for example, particles with a passivated surface comprising iron can also be used. Preferably, metal particles are surface modified, for example, with alkyl thiols, alkyl glycol thiols, alkyl amines, or glycol amines.

The resulting mixture can be applied onto the surface of a substrate and allowed to dry as described above, and the water-soluble polymer and chromonic matrix can optionally be removed as described above to yield a regular two-dimensional array of nanostructures (that is, an array of relatively uniformly sized and shaped nanostructures that are substantially evenly spaced). These arrays are useful in numerous applications. For example, nanostructured silica surfaces can be useful in micro-lens arrays, nanostructured surfaces of magnetic particles can be useful in magnetic recording applications, and nanostructured diamond surfaces can be useful as abrasives.

The method of the invention can facilitate the fabrication of nanostructured surfaces over large areas (for example, areas greater than 1 cm$^2$ (preferably greater than 1 m$^2$)). Depending upon the materials used, the nanostructured surfaces can be useful as protective coatings (for example, to provide corrosion resistance, diffusion barriers, thermal barriers, abrasion resistance, and/or ion bombardment protection) optical coatings (for example, to provide antireflective or antistatic properties, or as optical waveguides), conversion coatings (for example, to promote adhesion), and the like.

EXAMPLES

Objects and advantages of this invention are further illustrated by the following examples, but the particular materials and amounts thereof recited in these examples, as well as other conditions and details, should not be construed to unduly limit this invention.

Unless otherwise noted, all reagents and compounds were or can be obtained from Aldrich Chemical Co., Milwaukee, Wis.

As used herein,

"Purified water" refers to water available under the trade designation "OMNISOLVE" from EMD Chemicals, Inc., Gibbstown, N.J.;

"APG 325" refers to a 70 weight percent aqueous solution of an alkyl polyglucoside, a non-ionic surfactant available from Cognis Corp. USA, Cincinnati, Ohio.

Example 1

Preparation of a Nanostructured Chromonic Coating Using Polyvinyl Alcohol

A mixture of purified water (10.0 g), lithium hydroxide (0.13 g), APG 325 (0.1 g), polyvinyl alcohol (1.0 g of a 20 weight percent aqueous solution of polyvinyl alcohol, approximately 75 percent hydrolyzed and having a molecular weight of approximately 2000) was magnetically stirred in a flask for approximately 15 minutes. The chromonic compound of Formula III (1.0 g) was then added to the mixture and the resultant mixture was magnetically stirred for an additional 30 minutes to provide a mixture for coating. This mixture was coated onto a glass microscope slide using a #4 wound wire coating rod. The coating was allowed to dry in air at room temperature for at least 5 minutes and was analyzed by optical microscopy using a Model DM4000M microscope (available from Leica Microsystems, Inc., Bannockburn, Ill.) at 1000 power. An optical micrograph of the coating is shown as a FIGURE, in which the dark features identify the separated polyvinyl alcohol phase and the lighter features identify the separated chromonic phase.

Example 2

Preparation of a Nanostructured Chromonic Coating Using Polypropylene Glycol 3000

A mixture of purified water (10.0 g), ammonium hydroxide (0.13 g of a 30 weight percent aqueous solution), APG 325 (0.1 g), polypropylene glycol 3000 (0.1 g; having a number average molecular weight of approximately 3000; obtained from Alfa Aesar, Ward Hill, Mass.) was magnetically stirred in a flask for approximately 15 minutes. The chromonic compound of Formula III (1.0 g) was then added to the mixture and the resultant mixture was magnetically stirred for an additional 30 minutes to provide a mixture for coating. This mixture was coated onto a glass microscope slide using a #4 wound wire coating rod. The coating was allowed to dry in air at room temperature for at least 5 minutes and was examined by optical microscopy using a Model DM4000M microscope (available from Leica Microsystems, Inc., Bannockburn, Ill.) at 1000 power. Dark and light features were observed and were identified as the separated polypropylene glycol and the chromonic phases, respectively.

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

I claim:

1. A method comprising:
   (a) making an aqueous composition comprising (i) a phase comprising a water-soluble polymer, and (ii) a continuous phase comprising a chromonic material;
   (b) applying the aqueous composition onto the surface of a substrate; and
   (c) drying the aqueous composition, wherein the water-soluble polymer and the chromonic material are visibly distinct and separate phases.

2. The method of claim 1 wherein the chromonic material is represented by one of the following general structures:

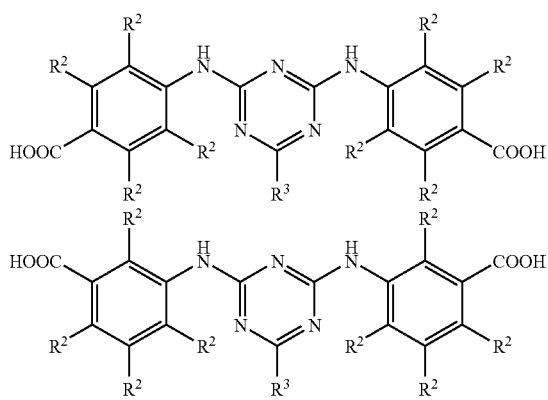

wherein
   each $R^2$ is independently selected from the group consisting of electron donating groups, electron withdrawing groups, and electron neutral groups, and
   $R^3$ is selected from the group consisting of substituted and unsubstituted heteroaromatic rings and substituted and unsubstituted heterocyclic rings, the rings being linked to the triazine group through a nitrogen atom within the ring of $R^3$,
   or zwitterions, proton tautomers, or salts thereof.

3. The method of claim 2 wherein the chromonic material is represented by one of the following structures:

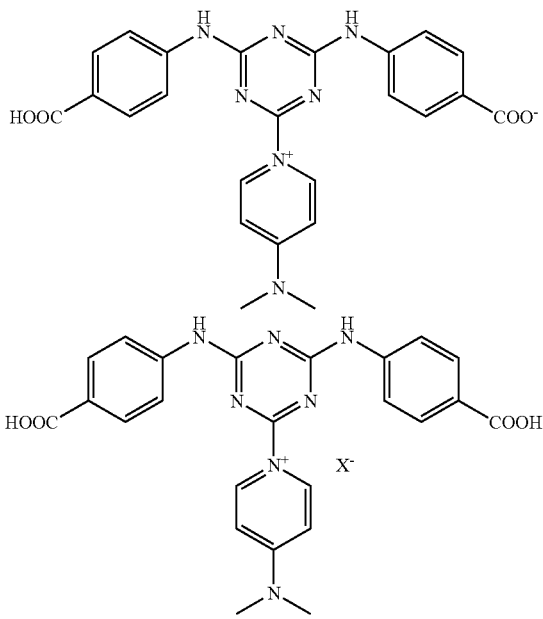

wherein $X^-$ is a counterion.

4. The method of claim 1 wherein the weight ratio of water-soluble polymer to chromonic material is between about 0.01:1 and about 0.5:1.

5. A method of making nanostructured surfaces, said method comprising:
   (a) making an aqueous composition comprising (i) a phase comprising a water-soluble polymer, and (ii) a continuous phase comprising a chromonic material;
   (b) applying the aqueous composition onto the surface of a substrate;
   (c) drying the aqueous composition to form a structure; and
   (d) removing the water-soluble polymer after the aqueous composition is dry, with said water-soluble polymer and said chromonic material being phase separated.

6. The method of claim 5 further comprising applying a water-insoluble polymer or a molten metal on the chromonic material, after removing the water-soluble polymer, so as to go into holes or gaps formed by said removing of the water-soluble polymer, wherein the molten metal has a melting point lower than the decomposition temperature of the chromonic material.

7. The method of claim 6 wherein a water-insoluble polymer is applied on the chromonic material; with said method further comprising separating the water-insoluble polymer from the chromonic material.

8. The method of claim 5 further comprising applying a water-insoluble polymer precursor on the chromonic material after removing the water-soluble polymer, such that the water-insoluble polymer precursor goes into holes or gaps formed by said removing of the water-soluble polymer; and polymerizing the precursor.

9. A method of making nanostructured surfaces, said method comprising:
(a) making an aqueous composition comprising (i) a phase comprising a water-soluble polymer, (ii) a continuous phase comprising a chromonic material, and (iii) a metal salt;
(b) applying the aqueous composition onto the surface of a substrate; and
(c) drying the aqueous composition to form a structure, with the water-soluble polymer and the chromonic material being phase separated.

10. The method of claim 9 wherein the metal salt is reduced to form metal, after the aqueous composition is dry.

11. The method of claim 10 further comprising removing one or the other or both of the water-soluble polymer and the chromonic material.

12. The method of claim 1 wherein the phase comprising a water-soluble polymer further comprises water-insoluble particles.

13. The method of claim 12 further comprising removing one or the other or both of the water-soluble polymer and the chromonic material.

14. The method of claim 1 wherein the water-soluble polymer is discontinuous.

15. The method of claim 1 wherein the phase comprising a water-soluble polymer and the phase comprising a chromonic material are phase separated in the aqueous composition.

16. The method of claim 1 wherein the aqueous composition further comprises a surfactant in an amount suitable for promoting wetting of the aqueous composition onto the surface of the substrate during said applying.

17. The method of claim 1 wherein said making an aqueous composition further comprises adding water-insoluble particles to the water-soluble polymer, before the phase comprising a chromonic material is added.

18. The method of claim 1 wherein the chromonic material defines a plurality of holes or gaps that are filled with the water-soluble polymer so as to form a plurality of structures comprising the water-soluble polymer that are shaped like the holes or gaps.

19. The method of claim 5 wherein the aqueous composition further comprises a surfactant in an amount suitable for promoting wetting of the aqueous composition onto the surface of the substrate during said applying.

20. The method of claim 6 wherein a molten metal is applied on the chromonic material, with said method further comprising solidifying the molten metal on the chromonic material; and separating the solidified metal from the chromonic material.

21. The method of claim 20 wherein the solidified metal separated from the chromonic material has a nanostructured metal surface in the form of a mesh or grid.

22. The method of claim 9 wherein the aqueous composition further comprises a surfactant in an amount suitable for promoting wetting of the aqueous composition onto the surface of the substrate during said applying.

* * * * *

UNITED STATES PATENT AND TRADEMARK OFFICE
CERTIFICATE OF CORRECTION

PATENT NO. : 7,687,115 B2
APPLICATION NO. : 11/284541
DATED : March 30, 2010
INVENTOR(S) : Hassan Sahouani It is certified that error appears in the above-identified patent and that said Letters Patent is hereby corrected as shown below:

Column 10, Line 59 (Approx.) – In Claim 7, delete "material;" and insert -- material, --, therefor.

Signed and Sealed this

Eighth Day of June, 2010

David J. Kappos
*Director of the United States Patent and Trademark Office*